US012604913B1

(12) United States Patent
Tang

(10) Patent No.: US 12,604,913 B1
(45) Date of Patent: Apr. 21, 2026

(54) SMOKER

(71) Applicants: Sanwu Technology (Shenzhen) Co., Ltd., Shenzhen (CN); Shenzhen Kaisiwei Technology Co., Ltd., Shenzhen (CN); Shenzhen Yuanhongchuang Technology Co., Ltd., Shenzhen (CN)

(72) Inventor: Congcong Tang, Shenzhen (CN)

(73) Assignees: Sanwu Technology (Shenzhen) Co., Ltd., Shenzhen (CN); Shenzhen Kaisiwei Technology Co., Ltd., Shenzhen (CN); Shenzhen Yuanhongchuang Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/178,118

(22) Filed: Apr. 14, 2025

(30) Foreign Application Priority Data

Feb. 25, 2025 (CN) ......................... 202520304306.X
Apr. 7, 2025 (CN) ......................... 202520644627.4

(51) Int. Cl.
*A23B 4/052* (2006.01)
(52) U.S. Cl.
CPC ................................. *A23B 4/0523* (2013.01)

(58) Field of Classification Search
CPC ........ A24F 40/00; A24F 40/42; A23B 4/0523; A23B 4/052; A23B 15/241
See application file for complete search history.

(56) References Cited

U.S. PATENT DOCUMENTS

| | | | |
|---|---|---|---|
| 12,324,440 B1* | 6/2025 | Zheng | A23B 4/052 |
| 2016/0183722 A1* | 6/2016 | Fisher | A47J 37/0754 99/425 |
| 2021/0086219 A1* | 3/2021 | Hsiao | B08B 3/08 |

FOREIGN PATENT DOCUMENTS

| CN | 209284220 U | 8/2019 |
|----|-------------|--------|
| CN | 221152950 U | 6/2024 |

* cited by examiner

*Primary Examiner* — Brian W Jennison
(74) *Attorney, Agent, or Firm* — JEEN IP LAW, LLC

(57) ABSTRACT

Provided is a smoker, including a housing. A main control circuit board and a battery are arranged in the housing, the bottom of the housing is provided with an igniter, and the igniter is electrically connected to the main control circuit board. The smoker further includes a base, the base is detachably arranged at the bottom of the housing, and is provided with a tray slot, a tray is arranged in the tray slot, and the tray is arranged below the igniter. The tray slot is provided with a smoke outlet. The smoker has simple structure, convenient operation, and high utilization rate of generated smoke.

8 Claims, 5 Drawing Sheets

SMOKER

CROSS-REFERENCE TO RELATED APPLICATIONS

This application claims priority to Chinese Patent Application No. 202520304306.X, filed on Feb. 25, 2025 and Chinese Patent Application No. 202520644627.4, filed on Apr. 7, 2025, which are hereby incorporated by reference in its entirety.

TECHNICAL FIELD

The present disclosure relates to the technical field of food processing, and in particular to a smoker.

BACKGROUND

In the past, the smoking of the drinks and food materials relied on the burning of wood chips in a manner of natural smoke diffusion, presenting the limitations of fire hazard potential and smoke utilization inefficiency.

In Chinese patent No. CN209284220U, a smoker with an ignition function is provided, which includes a housing, a power supply, a main control circuit board and a blowing device in the housing. An accommodating cavity is arranged in the housing, a bracket is movably mounted in the accommodating cavity, and a guide hole is formed in the bottom of the bracket. The blowing device includes an air guide cylinder, a motor, and fan blades. An air guide cavity is formed in the air guide cylinder, and the motor and the fan blades are mounted at a rear end of the air guide cavity. An air guide port communicating with a guide hole is formed in a sidewall of the air guide cylinder, a smoke outlet is formed in a front end of the air guide cylinder, and an air inlet communicating with the air guide port is further arranged on the housing. A side of the bracket is provided with a telescopic mechanism and an electronic ignition device. The electronic ignition device includes an electric heating wire, and the electric heating wire is electrically connected to a microswitch. The electric heating wire, the motor and the power supply are electrically connected to the main control circuit board. The telescopic mechanism includes a movable support movably connected to the housing, the electric heating wire is fixedly mounted on the movable support, and the electric heating wire can extend into the bracket in a horizontal direction through the movable support. Smoking spices are arranged in an opening of the bracket, the opening leads to smoke loss and low utilization rate.

In Chinese patent No. CN221152950U, a full-automatic electronic smoker is provided, including a smoke generating base, and a handheld exhaust fan. The smoke generating base is detachably arranged at the handheld exhaust fan, and the smoke generating base includes a base housing, and an accommodating cavity is arranged in the base housing. An electric heating wire is arranged at the accommodating cavity. The handheld exhaust fan includes a shell assembly, and an air duct is formed in the shell assembly and is configured to connect an opening and an air outlet of the accommodating cavity. A fan is arranged at the air duct, and a control assembly is further arranged in the shell assembly. A storage pocket for holding smoking spices or wood chips is arranged in the accommodating cavity, and the smoke generated by heating is blown out through the air duct, so the smoke utilization rate is high, but the structure is complicated.

SUMMARY

An objective of the present disclosure is to provide a smoker, which has simple structure, convenient operation, and high utilization rate of generated smoke.

The technical solution adopted by the smoker provided by the present disclosure is as follows:

A smoker includes a housing. A main control circuit board and a battery are arranged in the housing, the bottom of the housing is provided with an igniter, and the igniter is electrically connected to the main control circuit board. The smoker further includes a base, the base is detachably arranged at the bottom of the housing and is provided with a tray slot, a tray is arranged in the tray slot, the tray is arranged below the igniter, and the tray slot is provided with a smoke outlet.

As a preferred solution, the bottom of the housing is provided with a heat shield, the heat shield is provided with a through hole, and an igniting head of the igniter extends out of the through hole of the heat shield.

As a preferred solution, the base and the bottom of the housing are in snap-fit connection or magnetic connection.

As a preferred solution, the smoker further includes a lamp panel. The lamp panel is provided with multiple lamp beads, the lamp beads are electrically connected to the main control circuit board, the lamp panel is arranged on an upper surface of the base, the base is provided with lamp holes, and the lamp beads are correspondingly arranged in the lamp holes.

As a preferred solution, the smoker further includes fan blades, a fan blade support, and a motor. The fan blades, the fan blade support and the motor are arranged in the housing, the fan blades are arranged in the fan blade support, the motor is electrically connected to the main control circuit board, and the fan blades are in transmission connection with an output shaft of the motor. The housing is provided with an air inlet, the bottom of the housing is provided with an air vent, the motor is configured to drive the fan blades to rotate, making the air outside the housing flow to the smoke outlet of the tray slot via the air inlet and the air vent.

As a preferred solution, the fan blade support is arranged above the igniter, and when the fan blades rotate, flame of the igniter is enabled to extend.

As a preferred solution, the base includes a base body, and an upper cover of the base. The upper cover of the base is fixed to the base body, a counter bore is formed in the upper cover of the base, and the counter bore on the upper cover of the base and the bottom of the base body form the tray slot. The smoke outlet is formed in the bottom of the base body, the tray is arranged at the counter bore of the upper cover of the base. The fan blades, the fan blade support and the motor are arranged in the base, the fan blades are arranged on the fan blade support, and the fan blades and the fan blade support are arranged at the bottom of the base body and located below the tray. The motor is electrically connected to the main control circuit board, and the fan blades are in transmission connection with the output shaft of the motor.

As a preferred solution, a lower surface of the upper cover of the base is provided with a sleeve, and the bottom of the base body is provided with a recess. The smoke outlet is formed in the recess of the base body, and the fan blades and the fan blade support are arranged in the recess of the base body and the sleeve.

As a preferred solution, the base is further provided with a circulating flow hole, which is configured to guide smoke discharged from the smoke outlet into the base.

As a preferred solution, the base is further provided with a vent port, which is configured to discharge the smoke in the base.

The smoker provided by the present disclosure has the beneficial effects that a base is detachably arranged at the bottom of a housing, the base is provided with a tray slot, a tray is arranged in the tray slot, and the tray is arranged below an igniter. A battery is configured to supply power to a main control circuit board and ignite the igniter, thus burning a smoking material in the tray, with convenient operation. The tray is arranged in the base, the smoke generated by the smoking material in the tray is discharged to food to be smoked through the smoke outlet in the tray slot. The smoker provided by the present disclosure is placed on a container for holding the food, and then the smoker and the container are sealed, making the utilization rate of the smoke high. Moreover, the structure of the smoker is simple.

The fan blade support is arranged above the igniter, and when the fan blades rotate, the flame of the igniter is extended by airflow, which is more beneficial for the igniter to ignite the smoking material.

The base is provided with a circulating flow hole, which is configured to guide the smoke discharged from the smoke outlet into the base, and then the smoke in the base is discharged into a smoking container through the smoke outlet. As the speed of absorbing the smoke by the food is limited, the flowing of the smoke for smoking in the base and the smoking container is improved through the circulating flow hole, which is conducive to the burning of the smoking material and the smoking effect of the food.

The base is further provided with a vent port for discharging the smoke in the base. Part of the smoke is discharged through the vent port, which can improve the air circulation in the base and is beneficial to sufficient burning of the smoking material.

DESCRIPTION OF EMBODIMENTS

The present disclosure is further illustrated and described below with reference to specific embodiments and accompanying drawings in the specification.

Embodiment 1

Figure 1:
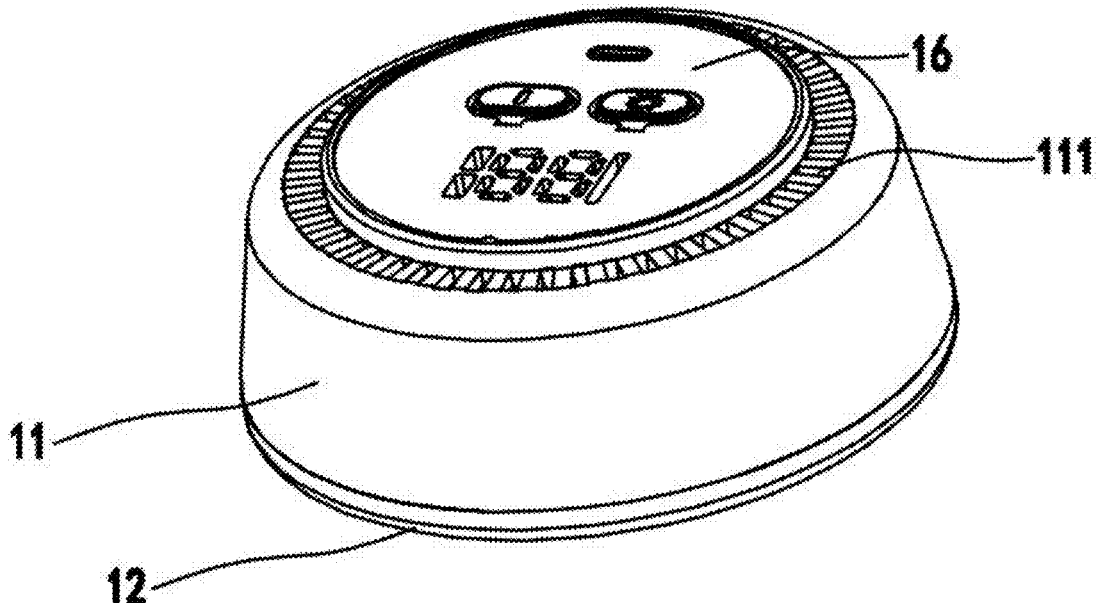
FIG. 1 is a three-dimensional diagram of a smoker according to Embodiment 1 of the present disclosure.
Figure 2:
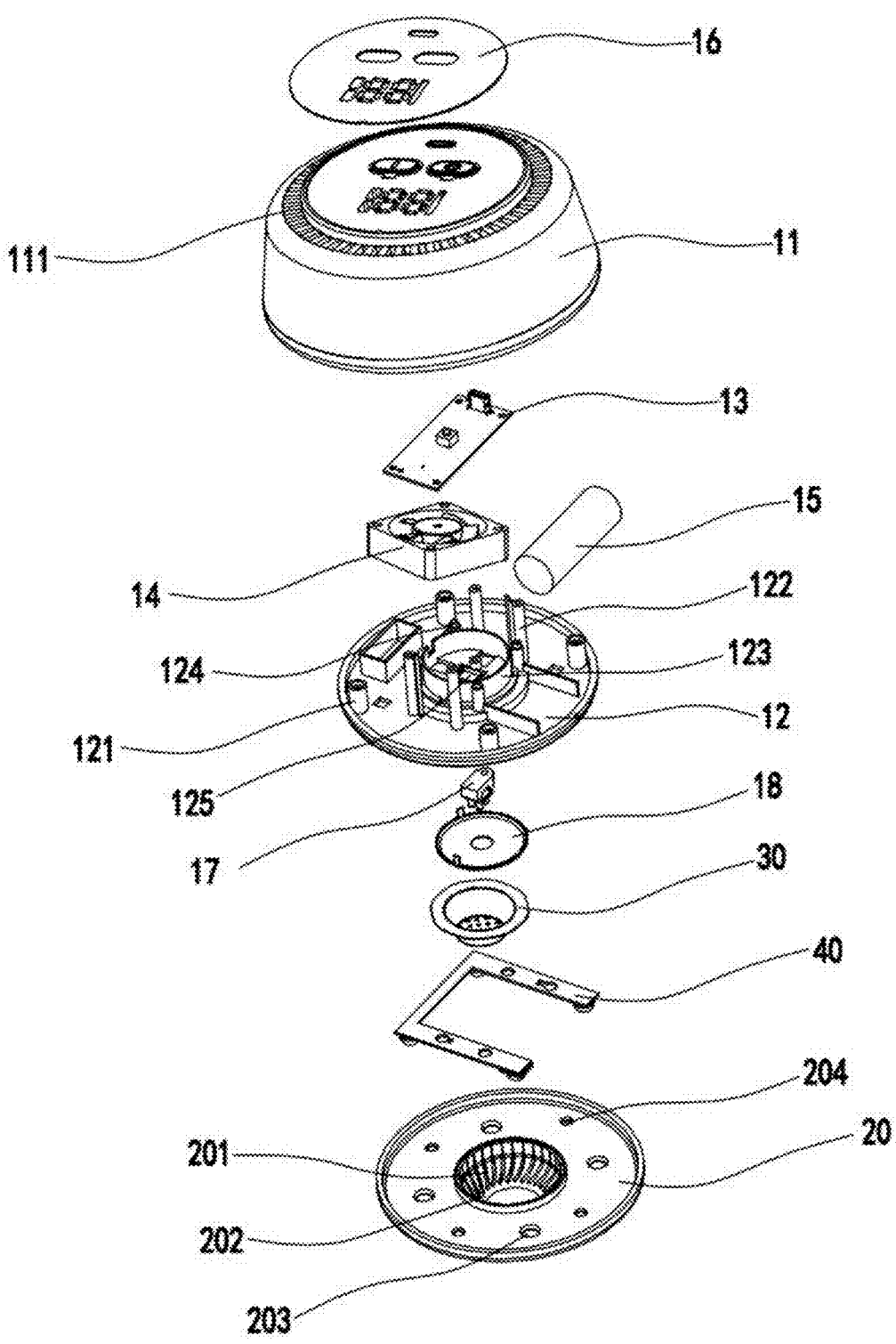
FIG. 2 is an exploded view of a smoker according to Embodiment 1 of the present disclosure.

Please referring to FIG. 1 and FIG. 2, a smoker includes a housing, and a base 20. The base 20 is detachably arranged at the bottom of the housing.

In this embodiment, the housing includes an upper housing 11, and a lower housing 12. An upper surface of the upper housing 11 is provided with an operation panel 16, and an air inlet 111. The air inlet 111 is formed in the periphery of the operation panel 16.

A lower surface of the upper housing 11 is provided with an upper fixing post, and the upper fixing post is not shown in the figure.

In the upper housing 11 and the lower housing 12, a main control circuit board 13, an igniter 17, a battery 15, a fan blade support 14, fan blades and a motor are provided. The fan blades and the motor are not shown in the figure. The lower housing 12 is provided with a lower fixing post 121, a circuit board mounting post 122, a tube sleeve 123, a support mounting post 124, and an air vent 125. The air vent 125 is located in an enclosed space of the tube sleeve 123. The lower fixing post 121 corresponds to the upper fixing post on the upper housing and is configured to fixedly connect the upper housing 11 and the lower housing 12 by a screw. The circuit board mounting post 122 is higher than the support mounting post 124. The main control circuit board 13 is fixedly mounted on the circuit board mounting post 122, and the fan blade support 14 is fixedly mounted on the support mounting post 124. The fan blades are rotatably mounted on the fan blade support 14, and the fan blades are in transmission connection with an output shaft of the motor. The battery 15 is configured to supply power to the main control circuit board 13, and the igniter 17 and the motor are electrically connected to the main control circuit board 13, respectively.

In this embodiment, a heat shield 18 is buckled on a lower surface of the lower housing 12, and configured to protect the lower housing 12. The heat shield 18 is provided with a through hole, an igniting head of the igniter 17 extends out of the air vent 125 of the lower housing 12 and the through hole of the heat shield 18.

In this embodiment, the fan blade support 14 is arranged above the igniter 17, and when the fan blades rotate, the flame of the igniter 17 is extended by airflow blowing to the igniter 17, which is more beneficial for the igniter 17 to ignite a smoking material.

The base 20 is provided with a tray slot 202 and lamp holes 203. In this embodiment, an edge of the base 20 is threaded to an edge of the lower housing 12. A tray 30 is arranged in the tray slot 202, and the tray 30 is located below the igniter 17. A bottom surface of the tray slot 202 is flat, and a side surface of the tray slot 202 is arc-shaped. The side surface of the tray slot 202 is provided with a smoke outlet 201. In this embodiment, the bottom of the tray 30 is provided with a small hole. A lamp panel 40 is arranged on an upper surface of the base 20, and multiple lamp beads are arranged on the lamp panel 40. The lamp beads are electrically connected to the main control circuit board, and correspondingly arranged in lamp holes 203 of the base 20.

The tray 30 is configured to hold the smoking material or wood chips, the smoker is placed on the container for holding food, and the housing of the smoker is sealed with the container. Through the operation panel 16, the igniter 17 is enabled to ignite the smoking material or wood chips to drive the motor to rotate and drive the fan blades to rotate, thus enabling the air outside the housing to flow to the tray slot 202 through the air inlet 111, the air vent 125 and the through hole in the heat shield 18 to facilitate the burning of the smoking material or the wood chips. The smoke generated by burning is discharged through the small hole in the bottom of the tray 30 and the smoke outlet 201 in the side surface of the tray slot 202 to smoke the food in the container. The burnt smoking material or wood chips remains in the tray 30 or falls on a plane part of the tray slot 202 through the small hole. When an upper surface of the tray 30 is not attached to the heat shield 18 or the lower housing 12, the generated smoke can be discharged to the smoke outlet 201 in the side surface of the tray slot 202 through a gap between the tray 30 and the heat shield 18 or the lower housing 12, thus smoking the food. The structure is simple, and the operation is convenient. As the tray 30 is placed in the base 20 and the housing, the generated smoke is high in utilization rate. The lighted lamp beads can irradiate the smoked food, especially smoked wine products, and thus the smoking effect and an operation state can be observed.

In other embodiments, when the heat shield 18 is large, for example, the heat shield 18 is greater than the cross section of the tray 30, the heat shield 18 can be embedded into the lower housing, most of the heat generated by the smoking material or wood chips in the tray 30 during burning radiates to the heat shield 18, and the heat shield 18 can also play a role in protecting the lower housing 12.

In other embodiments, the base 20 is further provided with a vent port 204, which is formed in the periphery of the smoke outlet 201 to communicate the base 20 with the outside air and is configured to discharge the smoke for smoking in the base 20. Because the speed of absorbing the smoke by the food is slow and the air in the smoking container is poorly ventilated, the smoking material cannot be burnt sufficiently. By discharging part of the smoke for smoking through the vent port 204, the air circulation in the base is improved, which is beneficial to the sufficient burning of the smoking material. An experiment proves that by providing the vent port 204, it is observed that the diffusion speed of the smoke to the smoking container is increased.

Embodiment 2

Figure 3:
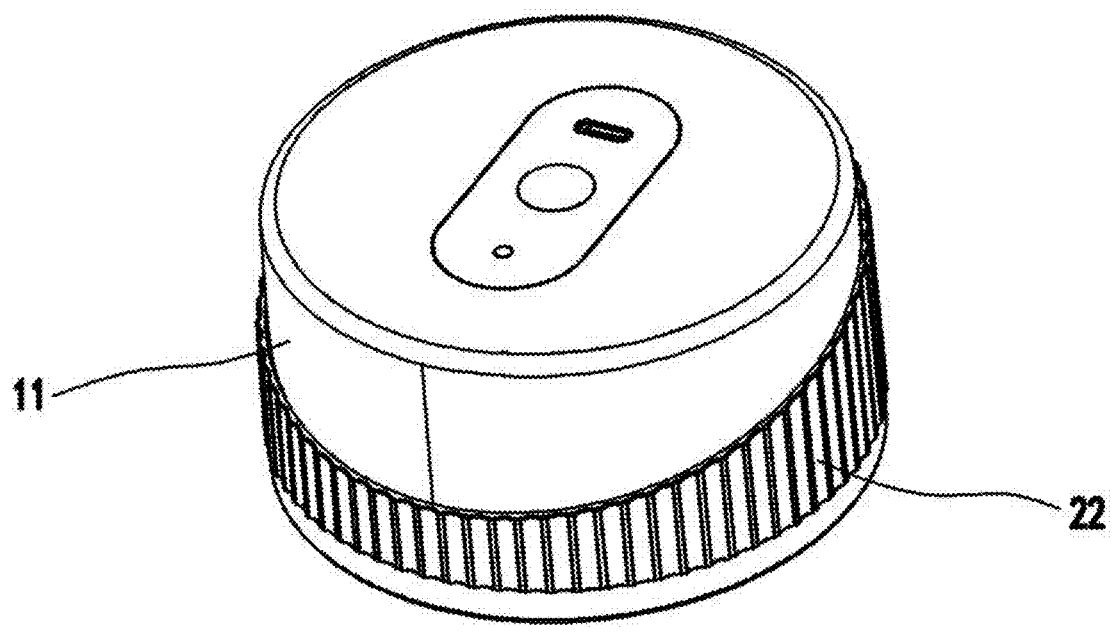
FIG. 3 is a three-dimensional diagram of a smoker according to Embodiment 2 of the present disclosure.
Figure 4:
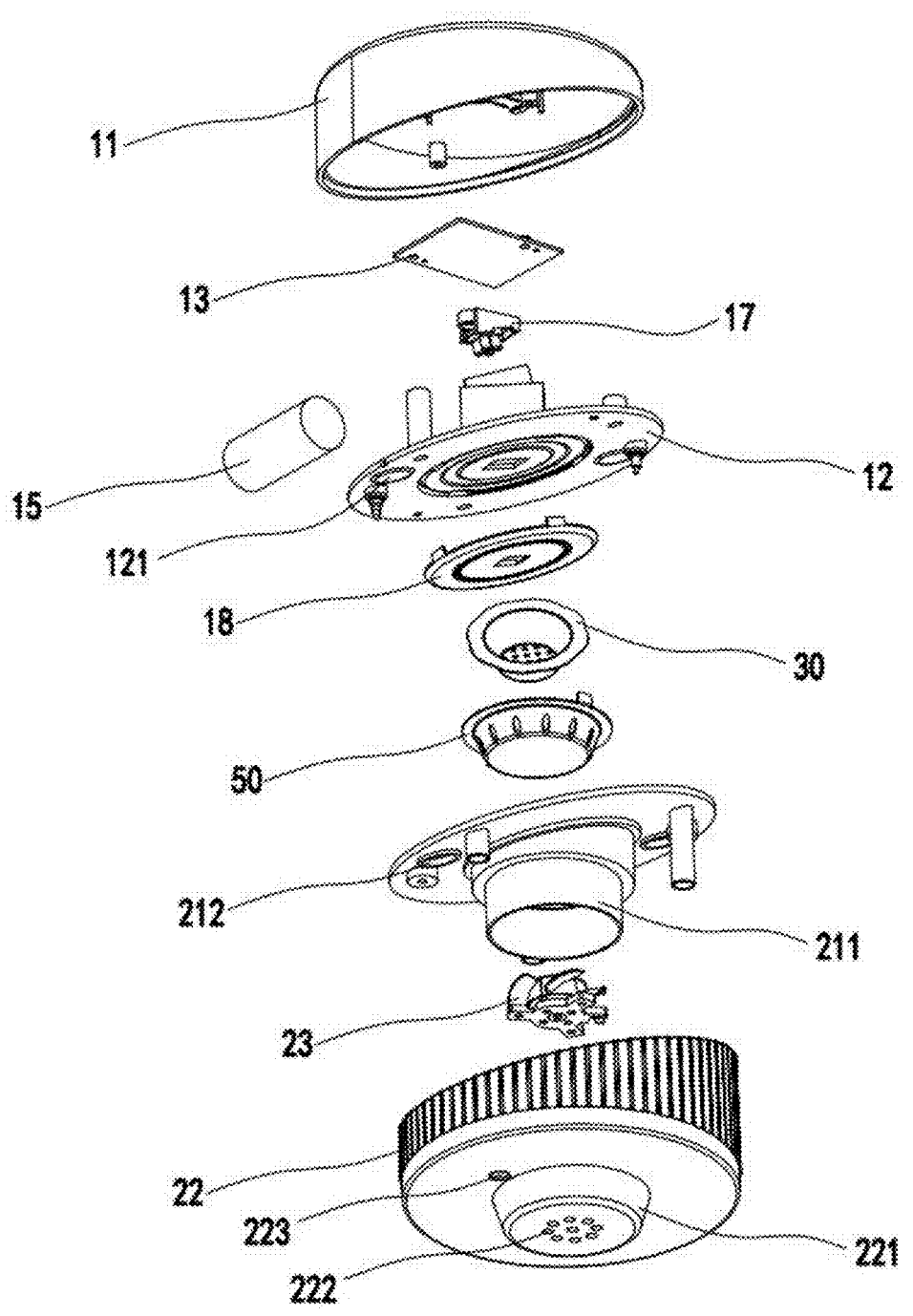
FIG. 4 is an exploded view of a smoker according to Embodiment 2 of the present disclosure.

Please referring to FIG. 3 and FIG. 4, a smoker includes a housing, and a base. The base 20 is detachably arranged at the bottom of the housing.

In this embodiment, the housing includes an upper housing 11 and a lower housing 12. In the upper housing 11 and the lower housing 12, a main control circuit board 13, an igniter 17 and a battery 15 are provided. The battery 15 is configured to supply power to the main control circuit board 13, the igniter 17 is electrically connected to the main control circuit board 13, and the upper housing 11 and the lower housing 12 are fixedly connected by a screw. The lower housing 12 is provided with a magnetic slot 121, a magnet is arranged in the magnetic slot 121, a lower surface of the lower housing 12 is provided with a heat shield 18, and a through hole is formed in the heat shield 18. An ignition head of the igniter 17 extends out of the lower housing 12 and the heat shield 18.

The base includes a base body 22, and an upper cover 21 of the base. The upper cover 21 of the base is fixed to the base body 22, the upper cover 21 of the base is provided with a counter bore and a magnet groove 212. The magnet groove 212 corresponds to the magnetic slot 121 on the lower housing 12, and a magnet is arranged in the magnet groove 212. The base is attached to the housing by the magnet on the upper cover 12 of the base and the magnet of the lower housing 12. A lower surface of the upper cover 21 of the base is provided with a sleeve 211, and the sleeve 211 is arranged below the counter bore. The base body 22 is provided with a recess 221. The counter bore on the upper cover 21 of the base, the sleeve 211 and the recess 221 of the base body 22 form a tray groove, and the bottom of the recess 221 is provided with a smoke outlet 222. A tray 30 is arranged at the counter bore of the upper cover 21 of the base, a smoke vent port is formed in a side surface of the tray 30, and a filter screen is arranged in the tray 30. The filter screen in the tray 30 is configured to place a smoking material or wood chips. A fan blade support and fan blades 23 are arranged in the sleeve 211 of the upper cover 21 of the base and the recess 221 of the base body 22. The fan blades 23 are fixed to the fan blade support, a motor is also arranged in the base, the motor is electrically connected to the main control circuit board 13, and the fan blades are in transmission connection with an output shaft of the motor.

The main control circuit board 13 is configured to control the motor to rotate, making the smoke generated by the smoking material or the wood chips in the tray 30 discharged through the smoke vent port at the side surface of the tray 30, the sleeve 211 and the smoke outlet 222 at the recess 221 to smoke the food. The smoke generated by the smoking materials is relatively closed, with high smoke utilization rate, simple structure, and convenient operation.

In other embodiments, the bottom of the base body 22 is further provided with one or more circulating flow holes 223. The circulating hole 223 is configured to guide the smoke discharged to a smoking container from the smoke outlet 222 into the base body 22, and then the smoke in the base body 22 is discharged into the smoking container through the smoke outlet 222. As the speed of absorbing the smoke for smoking by the food is limited, the circulation of the smoke in the base body 22 and the smoking container is improved through the circulating flow hole, which is conducive to the burning of the smoking material and the smoking effect of the food. Meanwhile, the base body is further provided with a vent port, which is configured to discharge part of the smoke to improve the air circulation in the base, and is conducive to the sufficient burning of the smoking material.

Embodiment 3

Figure 5:
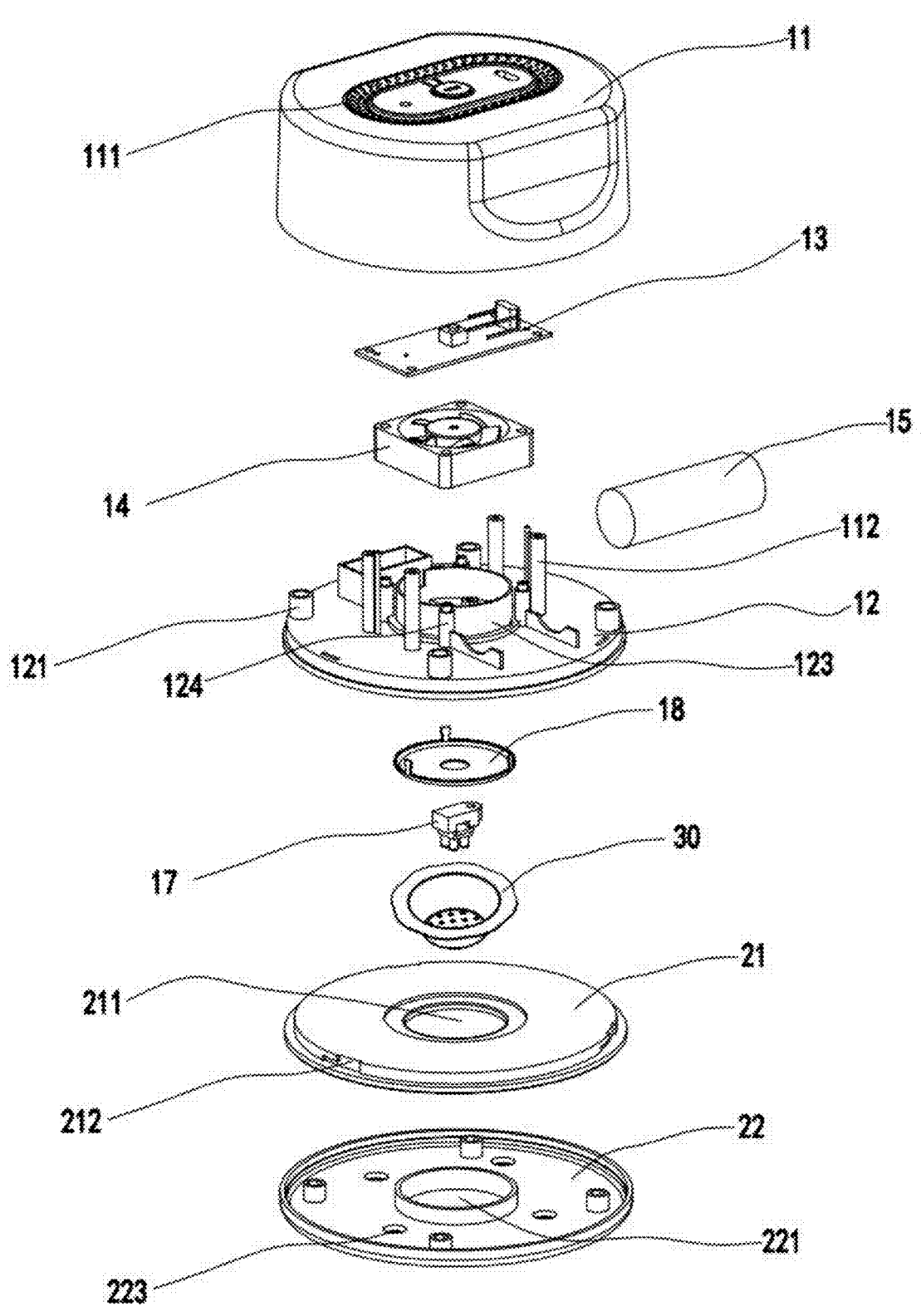
FIG. 5 is an exploded view of a smoker according to Embodiment 3 of the present disclosure.

Please referring to FIG. 5, compared with Embodiment 1, the structure of the base in this embodiment is different, the structure of the housing is the same, and thus will not be described in detail here. In this embodiment, the base includes a base body 22, and an upper cover 21 of the base. The upper cover 21 of the base is in snap fit with a lower housing 12 through a snap-fit groove 212. The upper cover 21 of the base is further provided with a sleeve 211 for a tray 30 to pass through. The base body 22 is provided with a tray slot 221 and a circulating flow hole 223, the bottom of the tray 30 extends out of the tray slot 221. The smoke generated by the smoking material on the tray 30 is discharged into a smoking container through a small hole formed in the bottom of the tray 30. The circulation of the smoke in the base body 22 and the smoking container is improved through the circulating flow hole 223, which is beneficial to the burning of smoking material and the smoking effect of food.

Finally, it should be noted that the above embodiments are only used to describe the technical solution of the present disclosure than limiting the scope of protection of the present disclosure. Although the present disclosure has been described in detail with reference to the better embodiments, those of ordinary skill in the art should understand that modification or equivalent substitutions can be made to the technical solution of the present disclosure without departing from the essence and scope of the technical solution of the present disclosure.

What is claimed is:

1. A smoker, comprising a housing, wherein a main control circuit board and a battery are arranged in the housing, a bottom of the housing is provided with an igniter, and the igniter is electrically connected to the main control circuit board: the smoker further comprises a base, the base is detachably arranged at the bottom of the housing and is provided with a tray slot, a tray is arranged in the tray slot, the tray is arranged below the igniter, and the tray slot is provided with a smoke outlet;

wherein the base comprises a base body;

a bottom of the base body is further provided with one or more circulating flow holes, the circulating hole is configured to guide smoke discharged to a smoking container from the smoke outlet into the base body, and then the smoke in the base body is discharged into the smoking container through the smoke outlet;

the base is further provided with a vent port, and the vent port is formed in a periphery of the smoke outlet to communicate the base with outside air and is configured to discharge the smoke for smoking in the base.

2. The smoker according to claim 1, wherein the bottom of the housing is provided with a heat shield, the heat shield is provided with a through hole, and an igniting head of the igniter extends out of the through hole of the heat shield.

3. The smoker according to claim 1, wherein the base and the bottom of the housing are in snap-fit connection or magnetic connection.

4. The smoker according to claim 1, further comprising a lamp panel, wherein the lamp panel is provided with a plurality of lamp beads, the lamp beads are electrically connected to the main control circuit board, the lamp panel is arranged on an upper surface of the base, the base is provided with lamp holes, and the lamp beads are correspondingly arranged in the lamp holes.

5. The smoker according to claim 1, further comprising fan blades, a fan blade support, and a motor, wherein the fan blades, the fan blade support and the motor are arranged in the housing, the fan blades are arranged in the fan blade support, the motor is electrically connected to the main control circuit board, the fan blades are in transmission connection with an output shaft of the motor, the housing is provided with an air inlet, the bottom of the housing is provided with an air vent, the motor is configured to drive the fan blades to rotate, making the air outside the housing flow to the smoke outlet of the tray slot via the air inlet and the air vent.

6. The smoker according to claim 5, wherein the fan blade support is arranged above the igniter, and when the fan blades rotate, flame of the igniter is enabled to extend.

7. The smoker according to claim 1, wherein the base comprises an upper cover;

the upper cover of the base is fixed to the base body, a counter bore is formed in the upper cover of the base, the counter bore on the upper cover of the base and the bottom of the base body form the tray slot: the smoke outlet is formed in the bottom of the base body, the tray is arranged at the counter bore of the upper cover of the base;

the fan blades, the fan blade support and the motor are arranged in the base, the fan blades are arranged on the fan blade support, and the fan blades and the fan blade support are arranged at the bottom of the base body and located below the tray; and the motor is electrically connected to the main control circuit board, and the fan blades are in transmission connection with the output shaft of the motor.

8. The smoker according to claim 7, wherein a lower surface of the upper cover of the base is provided with a sleeve, and the bottom of the base body is provided with a recess, the smoke outlet is formed in the recess of the base body, and the fan blades and the fan blade support are arranged in the recess of the base body and the sleeve.

* * * * *